Patented Mar. 9, 1937

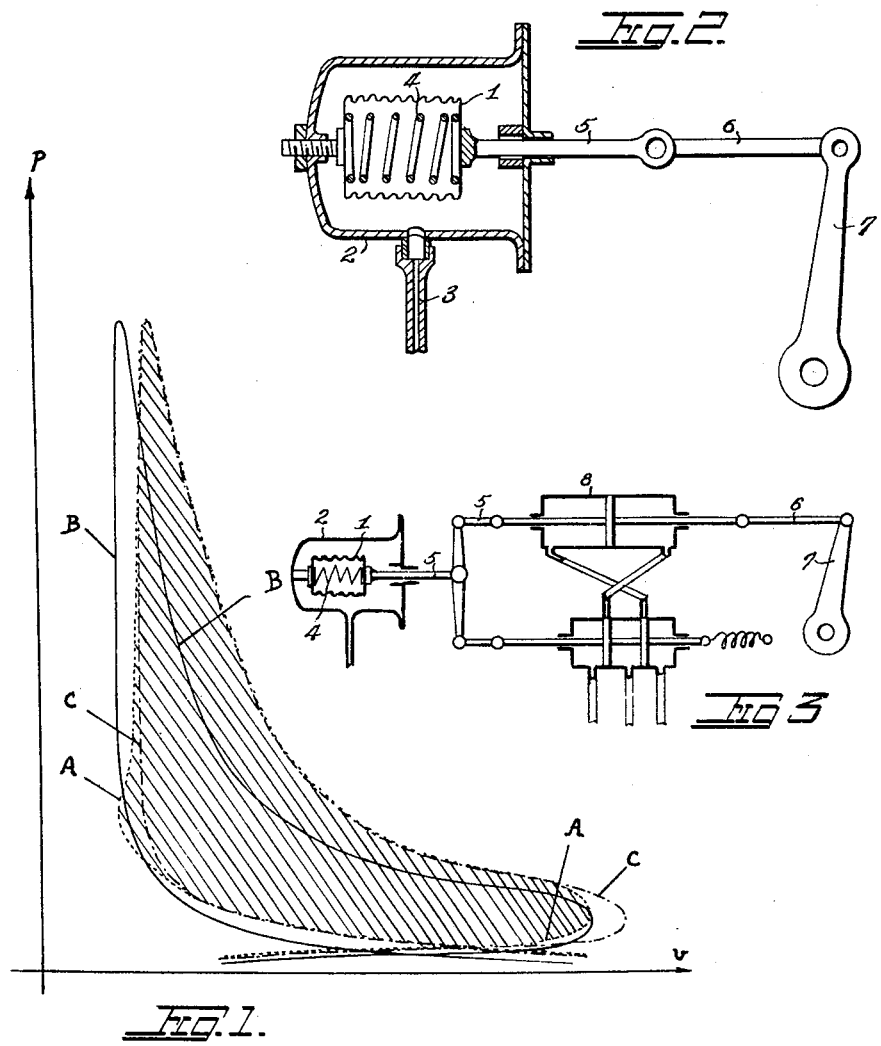

2,073,288

UNITED STATES PATENT OFFICE 2,073,288

METHOD AND ARRANGEMENT FOR THE OPERATION OF INTERNAL COMBUSTION ENGINES

Max Yves Antonin Serruys, Paris, France

Application November 30, 1932, Serial No. 645,072
In France December 3, 1931

4 Claims. (Cl. 123—1)

The present invention relates to a particular method of operation of internal combustion engines having high initial admission pressure and more particularly to aircraft motors of this kind.

It is known in fact that to improve the performance of the engine at high altitudes it has been found necessary for a long time to use supercharged engines for aviation. These engines are characterized by a very high initial admission pressure which ensures for them a very high efficiency at high altitudes, but which necessitates their being used for operation at ground level or low altitudes only with reduced admission.

Finally, calculation and experience show that under these conditions a supercharged engine yields at ground level and at low altitudes an output very much lower than could be given by an engine of equivalent construction under normal compression; the loss of power at ground level which results therefrom is generally even much greater than the gain obtained at high altitudes. That is a very serious drawback since it is precisely at the take-off and during the climb which usually follows it that it is advantageous to have as high a power at one's disposal as possible.

The object of the present invention is to obviate this disadvantage and to make available from the supercharged engines to which it is applied an output at ground level of the same order as that which may be obtained from an engine of the same construction under normal compression, the performance of the engine remaining the same at high altitudes.

If one considers for example a supercharged engine which can operate normally at full admission only from 2,000 m. altitude upwards and of which the maximum output is consequently about 16% lower than that which could be obtained from an engine of the same dimensions with normal compression, it will be possible by using the means forming the subject-matter of the invention to make good this deficiency and perhaps even to obtain a slight gain of power.

The main feature of the invention in order to obtain this result consists in restoring to an engine having high initial admission pressure, the full admission even below say 2,000 m. but in reducing at the same time the advance of the ignition by such an amount as is necessary to obviate detonation whenever this is likely to occur with ignition advanced by the normal amount. In other words, the performance of the engine in accordance with the invention remains the same as that of an ordinary engine whenever the charge admitted to it does not exceed the amount ordinarily allowed for the type of engine and the compression used, i. e. in aircraft above a certain altitude.

The arrangement according to the invention avails on the other hand when it is desired to obtain a greater power at a reduced altitude, and retards the completion of the combustion of the carburetted mixture in the cylinders.

At this moment and due to this delay the piston has traversed a sufficient proportion of its power stroke for the volume occupied by the gases to have a value perceptibly equal to that corresponding to the maximum pressure in an engine of the same type operating with normal compression.

The maximum pressure obtained is then itself also substantially of the same order and expansion as takes place under similar conditions.

In the accompanying drawing, Fig. 1 is a diagram explanatory of the operation of the invention;

Figs. 2 and 3 are diagrammatical illustrations of the invention, which are given by way of example only.

The performance of such an engine with full admission and at ground level is characterized by an indicator diagram such as the card A shown in dotted lines in Fig. 1 of the accompanying drawing which serves to explain the invention. The figure shows superposed:

(a) The card B, characteristic of an ordinary supercharged engine operating with the maximum admission compatible with the compression obtained (full lines);

(b) The card C, characteristic of the operation of an engine of the same type with normal compression, i. e. not supercharged, and working with full admission at ground level (chain dotted line);

(c) The card A (hatched), representative of the operation of a supercharged engine of the same type as for the card B, but operating according to the invention with full admission at ground level.

It will be seen from these cards:

(a) That the power corresponding to the full line card B is lower than that corresponding to the chain-dotted line card C, although the maximum pressures are the same, because the volume of gas expanded is less on account of reduced admission; on the other hand the efficiency is higher for the former.

(b) That the dotted line card A provides appreciably the same power and the same efficiency as the chain-dotted line card C (engine with normal compression) since the admission is the same and the expansion curve practically coincides with that of the former over almost the whole of its length.

In agreement with what has been mentioned above, the cards obtained on supercharged engines whether operating in accordance with the invention or not are the same for all values of admission equal to or less than that which corresponds to the full line card B.

A further feature of the invention in addition to the method of operation described above is the combination with an engine having a high initial admission pressure of a device reducing the ignition advance in conformity with the pressure which would be obtained at the end of compression if ignition were not to take place. This device may consist for example of a moving arrangement for regulating the ignition which is put into communication by a mechanical or other transmission with an elastic capsule. This capsule is partially or completely evacuated and is subjected to the action of the pressure ruling in the admission pipe-work. Any other suitable arrangement may be used which is controlled by this pressure such as a movable piston with a spring, a metallic pressure gauge, or the like.

This device, in accordance with what has been explained above, should only operate to reduce the ignition advance from the movement when the charge reaches such a value that detonation might occur in ordinary operating conditions, that is to say if the advance were to remain unchanged.

To obtain this result it will be sufficient to limit the deformation of the capsule under the effect of the partial vacuum by means of a stop arrangement. The capsule will then only become operative from the moment when it ceases to press on this stop.

In its assembly the correcting device in question will take the place of the automatic admission limiters actually in use on certain supercharged engines.

Such a correcting device is illustrated diagrammatically and by way of example only, in Figs. 2 and 3.

As there shown, the manometric capsule 1 is hermetically closed, and is hermetically welded or soldered under a determined pressure or under vacuum. It is contained in a closed casing 2, connected with the suction branch by a pipe 3. Thus the capsule 1 is outwardly influenced by the pressure existing in the suction branch and is entirely protected against the action of the atmospheric pressure. The capsule 1 contains a spring 4 and acts through a control rod 5 on a connecting rod 6 (Fig. 2) actuating the advance ignition lever 7, the displacements of which are therefore (as well as the displacements of the rod 5) a function of the pressure existing in the suction branch.

In the case of Figure 3 the pressure in the suction branch is caused to act on the lever 7 through the medium of an oil, electric or other servo-motor 8.

The advance ignition control lever can act either on the plate of the brakes of the magneto of the "Delco" if said plate is movable, or through the swinging of the magneto or the "Delco" themselves, or on a special member inserted in the control of these latter by the engine and producing a suitable shifting of the ignition point.

It is important to note that the manometric capsule is, according to the principle of the invention, entirely protected from the atmospheric pressure, so that the control of the advanced ignition is absolutely independent of the variations of the latter, this being necessary for aircraft engines.

It is of course understood that the high initial admission pressure, characterizing the engines for which the device according to the invention is intended, might, without it, result in a high peak of volumetric compression as well as in the over-fuelling of the engine or in the two combined. Further it should be stated that the expression "supercharged engine" is here to be taken as the equivalent to that of "engine with high initial admission pressure".

It is obvious that the operation of the device forming the subject-matter of the invention is independent of the angular speed of the engine; its action will then be superposed on that of the automatic spark advance arrangements ordinarily provided, the operation of which it will in no way impede.

What I claim is:

1. Method of operating internal combustion engines facilitating the use of a high initial pressure, which consists in reducing automatically and progressively the ignition advance in dependence on the absolute pressure in the manifold, when said pressure attains such a predetermined value that a pinking would occur if the ignition advance remained unvaried.

2. Method of operating internal combustion engines facilitating the use of a high initial pressure, which consists in reducing automatically and progressively the ignition advance in dependence on the absolute pressure in the manifold for the exact quantity which is necessary to prevent the pinking when this latter could occur with the normal ignition advance.

3. In an internal combustion engine with high initial pressure comprising a means for controlling the ignition advance, a pressure actuated means subjected on one side to the absolute pressure in the manifold and on the other side to a constant pressure, a stop arresting said means as long as the admission pressure remains inferior to the value at which a pinking would occur with a normal ignition advance, and connecting members between said means and the means for controlling the ignition advance, said members being mounted to reduce the ignition advance when the means subjected to the admission pressure moves under the action of an increase of said pressure, and vice versa.

4. In an internal combustion engine with high initial pressure comprising a means for controlling the ignition advance, an aneroid capsule subjected on one side to the absolute pressure in the manifold and on the other side to a constant pressure, a stop arresting said capsule as long as the admission pressure remains inferior to the value at which a pinking would occur with a normal ignition advance, and connecting members between said capsule and the means for controlling the ignition advance, said members being mounted to reduce the ignition advance when the aneroid capsule becomes deformed under the action of an increase of said pressure, and vice versa.

MAX YVES ANTONIN SERRUYS.